United States Patent
Chinbe et al.

(10) Patent No.: US 11,076,346 B2
(45) Date of Patent: Jul. 27, 2021

(54) MOBILE TERMINAL TESTING DEVICE AND SUPPORT COMBINATION ACQUISITION METHOD THEREOF

(71) Applicant: ANRITSU CORPORATION, Kanagawa (JP)

(72) Inventors: Ryota Chinbe, Kanagawa (JP); Tomohiro Kondo, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 0 days.

(21) Appl. No.: 16/747,167

(22) Filed: Jan. 20, 2020

(65) Prior Publication Data
US 2020/0275351 A1 Aug. 27, 2020

(30) Foreign Application Priority Data
Feb. 25, 2019 (JP) .............................. JP2019-031582

(51) Int. Cl.
*H04W 48/14* (2009.01)
*H04L 12/26* (2006.01)
*H04W 28/02* (2009.01)
*H04W 72/04* (2009.01)
*H04W 24/06* (2009.01)

(52) U.S. Cl.
CPC ............ *H04W 48/14* (2013.01); *H04L 43/50* (2013.01); *H04W 24/06* (2013.01); *H04W 28/0215* (2013.01); *H04W 72/0453* (2013.01)

(58) Field of Classification Search
CPC . H04W 48/14; H04W 24/06; H04W 73/0453; H04L 43/50
USPC .............. 370/338, 329; 455/423, 422.1, 418
See application file for complete search history.

(56) References Cited

U.S. PATENT DOCUMENTS

| | | | | |
|---|---|---|---|---|
| 2012/0207115 | A1* | 8/2012 | Oh | H04W 72/0413 370/329 |
| 2014/0092825 | A1* | 4/2014 | Bostrom | H04L 5/001 370/329 |
| 2015/0063143 | A1* | 3/2015 | Toskala | H04W 48/20 370/252 |
| 2015/0296464 | A1* | 10/2015 | Sagae | H04W 52/34 455/522 |
| 2017/0064542 | A1* | 3/2017 | Gopalan | H04W 8/18 |
| 2017/0317907 | A1* | 11/2017 | Chinbe | H04L 43/0888 |
| 2018/0006618 | A1* | 1/2018 | Mohta | H03F 3/72 |
| 2018/0368078 | A1* | 12/2018 | Vintola | H04B 7/0608 |
| 2020/0396706 | A1* | 12/2020 | Sandgren | H04W 56/003 |

FOREIGN PATENT DOCUMENTS

JP 2017-092827 A 5/2017

* cited by examiner

*Primary Examiner* — Danh G Le
(74) *Attorney, Agent, or Firm* — Pearne & Gordon LLP

(57) ABSTRACT

Provided is a mobile terminal testing device capable of shortening a time for obtaining a Band Combination supported by a mobile terminal. A mobile terminal testing device includes a control unit 6 that excludes a CA Band Combination including a Band that is not supported by a mobile terminal 10 from CA Band Combinations to which a relaxation value is applied, excludes a CA Band Combination that does not include any OperatingBand to be tested, and determines a Band to be included in RequestedBands from Bands included in the remaining CA Band Combinations.

6 Claims, 2 Drawing Sheets

MOBILE TERMINAL TESTING DEVICE AND SUPPORT COMBINATION ACQUISITION METHOD THEREOF

TECHNICAL FIELD

The present invention relates to a mobile terminal testing device which tests a mobile terminal.

BACKGROUND ART

In a case of developing a mobile terminal such as a mobile phone or a data communication terminal, it is necessary to test whether or not the developed mobile terminal can normally perform communication. Therefore, a testing device which operates as a pseudo base station simulating a function of an actual base station is connected to a mobile terminal to be tested, communication is performed between the testing device and the mobile terminal, and a test of checking the contents of the communication is performed.

Such a test includes a conformance test for checking whether or not the mobile terminal conforms to the 3rd Generation Partnership Project (3GPP) standard.

Each checking item in the conformance test is called a test case. When a mobile terminal supports carrier aggregation (CA), since the mobile terminal has a radio frequency (RF) circuit including a splitter, a relaxation value called delta TIB/delta RIB is applied to a test parameter in the transmission and reception test of the test case.

Since the delta TIB/delta RIB is determined for each CA Band Combination, it is necessary to analyze the CA Band Combination supported by the mobile terminal (user equipment; UE) from UE Capability information and determine the test parameter.

The UE Capability information of the mobile terminal is transmitted from the mobile terminal to a base station by using a signaling message.

Patent Document 1 describes a technique in which user equipment efficiently notifies a base station of its capability regarding carrier aggregation.

RELATED ART DOCUMENT

Patent Document

[Patent Document 1] JP-A-2017-92827

DISCLOSURE OF THE INVENTION

Problem that the Invention is to Solve

However, as the version of the carrier aggregation standard increases, the number of CA Band Combinations supported by mobile terminals increases, and UE Capability information grows. As a result, mobile terminals supporting Release 11 and later standards do not report all supported CA Band Combinations as UE Capability information, and instead, only CA Band Combinations including up to 16 Band groups requested by the base station (hereinafter referred to as "RequestedBands") are reported.

For example, considering Inter-band CA Band Combinations using five Bands, there are 12,103,014 choices when and selecting five Bands from some 70 Bands at present, and among the choices, the number of Band Combinations that can be implemented by 16 Bands, which can be transmitted in one RequestedBands, is 4,368. Only the mentioned number can be acquired, and in order to reliably acquire the Band Combinations supported by the mobile terminals, an enormous amount of messages are exchanged, and the testing time will be longer.

Accordingly, an object of the present invention is to provide a mobile terminal testing device capable of shortening a time for obtaining a Band Combination supported by a mobile terminal.

Means for Solving the Problem

A mobile terminal testing device according to the present invention is a mobile terminal testing device that performs a conformance test of a mobile terminal, and includes a control unit that excludes a CA Band Combination including a Band that is not supported by the mobile terminal from CA Band Combinations to which a relaxation value is applied, excludes a CA Band Combination that does not include any Operating Band to be tested, and determines a Band included in Requested Bands from Bands included in remaining CA Band Combinations.

With this configuration, the CA Band Combination including a Band that is not supported by the mobile terminal is excluded from the CA Band Combinations to which the relaxation value is applied, the CA Band Combination that does not include any Operating Band to be tested is excluded, and the Band included in the Requested Bands is determined from Bands included in remaining CA Band Combinations. For this reason, it is possible to shorten a time for obtaining a Band Combination supported by a mobile terminal.

Further, in the mobile terminal testing device of the present invention, the control unit may exclude a CA Band Combination including only transmitted RequestedBands, determine a Band to be included in next RequestedBands from Bands included in remaining CA Band Combinations, and repeat transmission of the RequestedBands until there is no remaining CA Band Combination.

With this configuration, the CA Band Combination including only transmitted RequestedBands is excluded, the Band to be included in next RequestedBands is determined from Bands included in the remaining CA Band Combinations, and transmission of the RequestedBands is repeated until there is no remaining CA Band Combination. For this reason, it is possible to shorten a time for obtaining a Band Combination supported by a mobile terminal. Further, in the mobile terminal testing device of the present invention, the relaxation value may be delta TIB or delta RIB.

Further, a support combination acquisition method of a mobile terminal testing device according to the present invention is a support combination acquisition method of a mobile terminal testing device that performs a conformance test of a mobile terminal, and includes a step of excluding a CA Band Combination including a Band that is not supported by the mobile terminal from CA Band Combinations to which a relaxation value is applied, a step of excluding a CA Band Combination that does not include any OperatingBand to be tested, and a step of determining a Band to be included in RequestedBands from Bands included in remaining CA Band Combinations.

With this configuration, the CA Band Combination including the Band that is not supported by the mobile terminal is excluded from the CA Band Combinations to which the relaxation value is applied, the CA Band Combination that does not include any Operating Band to be tested is excluded, and the Band included in the Requested Bands is determined from Bands included in remaining CA Band Combinations. For this reason, it is possible to shorten a time for obtaining a Band Combination supported by a mobile terminal. Further, the support combination acquisition method of a mobile terminal testing device of the present invention further includes a step of excluding a CA Band Combination including only transmitted RequestedBands, a step of determining a Band to be included in next RequestedBands from Bands included in the remaining CA Band Combinations, and a step of repeating transmission of RequestedBands until there is no remaining CA Band Combination. With this configuration, the CA Band Combination including only transmitted RequestedBands is excluded, the Band to be included in next RequestedBands is determined from Bands included in the remaining CA Band Combinations, and transmission of the RequestedBands is repeated until there is no remaining CA Band Combination. For this reason, it is possible to shorten a time for obtaining a Band Combination supported by a mobile terminal. Further, in the support combination acquisition method of a mobile terminal testing device, the relaxation value may be delta TIB or delta RIB.

Advantage of the Invention

According to the present invention, it is possible to provide a mobile terminal testing device capable of shortening a time for obtaining a Band Combination supported by a mobile terminal.

BEST MODE FOR CARRYING OUT THE INVENTION

Hereinafter, a mobile terminal testing device according to an embodiment of the present invention will be described in detail with reference to the drawings.

Figure 1:
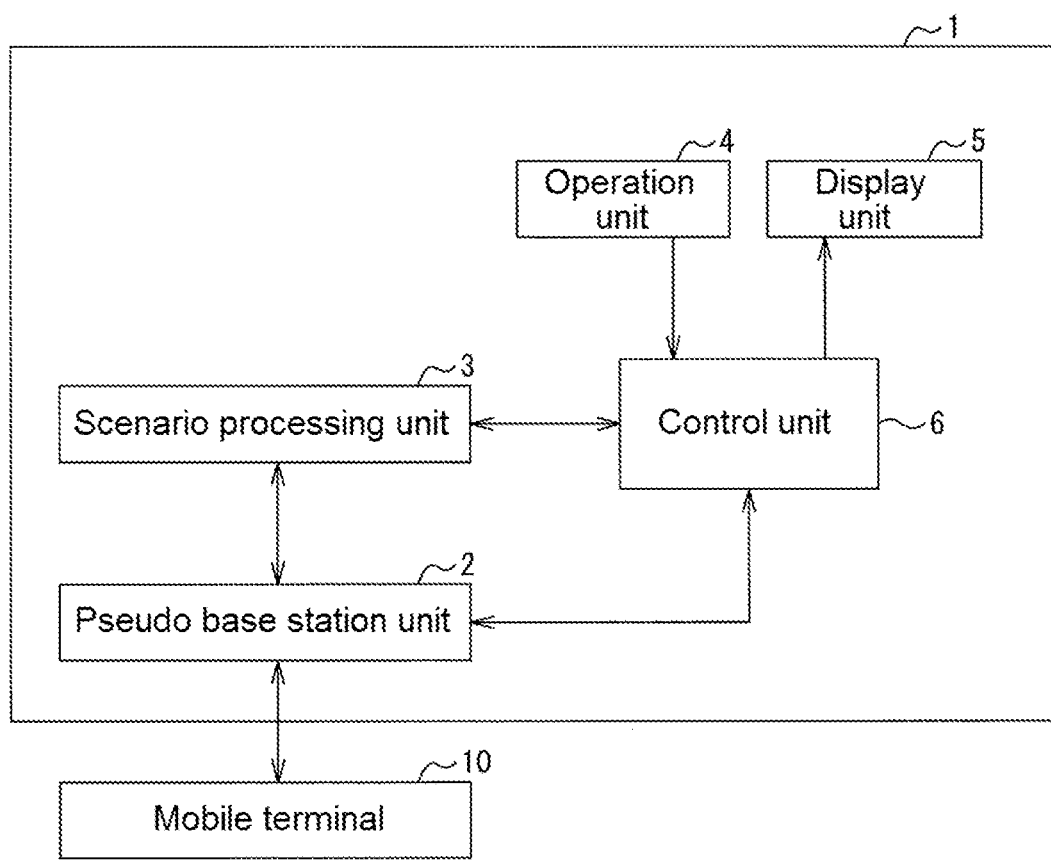
FIG. 1 is a block diagram of a main part of a mobile terminal testing device according to an embodiment of the present invention.

In FIG. 1, a mobile terminal testing device 1 according to an embodiment of the present invention as a pseudo base station transmits and receives radio frequency (RF) signals to and from a mobile terminal 10 through a coaxial cable or the like by wire. Further, the mobile terminal testing device 1 may transmit and receive RF signals to and from the mobile terminal 10 through an antenna by radio.

The mobile terminal testing device 1 includes a pseudo base station unit 2, a scenario processing unit 3, an operation unit 4, a display unit 5, and a control unit 6.

The pseudo base station unit 2 transmits and receives RF signals to and from the mobile terminal 10 under the control of the scenario processing unit 3. The pseudo base station unit 2 outputs the state of communication with the mobile terminal 10 to the control unit 6.

The scenario processing unit 3 reads out a stored scenario according to an instruction from the control unit 6, causes the pseudo base station unit 2 to transmit broadcast information based on the scenario, and execute a communication sequence with the mobile terminal 10.

The operation unit 4 is input devices such as a keyboard, a mouse, and a touch panel, and outputs operation-input information necessary for generating a scenario to the control unit 6. The display unit 5 is an image display device such as a liquid crystal display, and displays an image for inputting information necessary for generating a scenario and an image showing a state under test.

The control unit 6 displays a test scenario creation screen on the display unit 5 according to an instruction input on the operation unit 4 to input information necessary for creating a test scenario, or creates the test scenario based on the information input by the operation unit 4 on the test scenario creation screen. Further, the control unit 6 transmits an instruction to the scenario processing unit 3 according to the instruction input to the operation unit 4 to execute a test based on the test scenario stored in the storage device, or displays the state under test on the display unit 5, based on information on the state of each layer and the state of communication with the mobile terminal 10, which are transmitted from the scenario processing unit 3.

Here, the mobile terminal testing device 1 is constituted of a computer device (not shown) provided with a communication module for communicating with the mobile terminal 10. The computer device includes a central processing unit (CPU), a read only memory (ROM), a random access memory (RAM), a storage device such as a hard disk device, an input/output port, and a touch panel, which are not shown.

A program for making a computer device function as a mobile terminal testing device 1 is stored in a ROM and a hard disk device of the computer device. That is, the CPU executes the program stored in the ROM with the RAM as a work area, and the computer device functions as the mobile terminal testing device 1.

Thus, in the present embodiment, the scenario processing unit 3 and the control unit 6 are the CPU, and the pseudo base station unit 2 is the communication module.

In the mobile terminal testing device 1 having such a configuration, information on CA Band Combinations, to which a relaxation value is applied to a test parameter, is stored as a list in the storage device.

The control unit 6 excludes the CA Band Combination including a Band that is not supported by the mobile terminal 10, from CA Band Combinations to which the relaxation value is applied.

The Band supported by the mobile terminal 10 can be acquired from the UE Capability information.

The control unit 6 further excludes a CA Band Combination in which all Bands are not included in OperatingBand to be tested.

For example, in a case of the carrier aggregation test of Bands 1, 3 and 5, which are the targets to be tested, among the CA Band Combinations of two Bands supported by the mobile terminal 10, the CA Band Combination including any one of Bands 1, 3, and 5 is not excluded, since the relaxation value is to be considered for the CA Band Combination.

The control unit 6 determines a Band to be included in RequestedBands from Bands included in remaining CA Band Combinations from which such exclusion has been performed.

The control unit 6 transmits the determined RequestedBands to the mobile terminal 10 via the pseudo base station unit 2. The mobile terminal 10 returns, to the pseudo base station unit 2, the information on the CA Band Combination supported by the mobile terminal 10 among the CA Band Combinations including the Bands included in the received RequestedBands.

The control unit 6 excludes a CA Band Combination, in which all Bands are included in transmitted Requested- Bands, and determines Bands to be included in next RequestedBands from Bands included in the remaining CA Band Combinations.

The control unit 6 repeats transmission of the RequestedBands to the mobile terminal 10 until there is no remaining CA Band Combination.

As described above, in the present embodiment, a CA Band Combination including a Band that is not supported by a mobile terminal 10 is excluded from CA Band Combinations to which a relaxation value is applied, a CA Band Combination, in which all Bands are not included in the OperatingBand to be tested, is further excluded, and a Band to be included in RequestedBands is determined from Bands included in the remaining CA Band Combinations.

For this reason, in acquiring the CA Band Combination supported by the mobile terminal 10, the number of messages transmitted and received to and from the mobile terminal 10 can be reduced and thus the time taken can be shortened.

Further, the CA Band Combination, in which all Bands are included in the transmitted RequestedBands, is excluded, and the Band to be included in next Requested Bands is determined from Bands included in the remaining CA Band Combinations.

For this reason, in acquiring the CA Band Combination supported by the mobile terminal 10, the number of messages transmitted and received to and from the mobile terminal 10 can be reduced and thus the time taken can be shortened.

Figure 2:
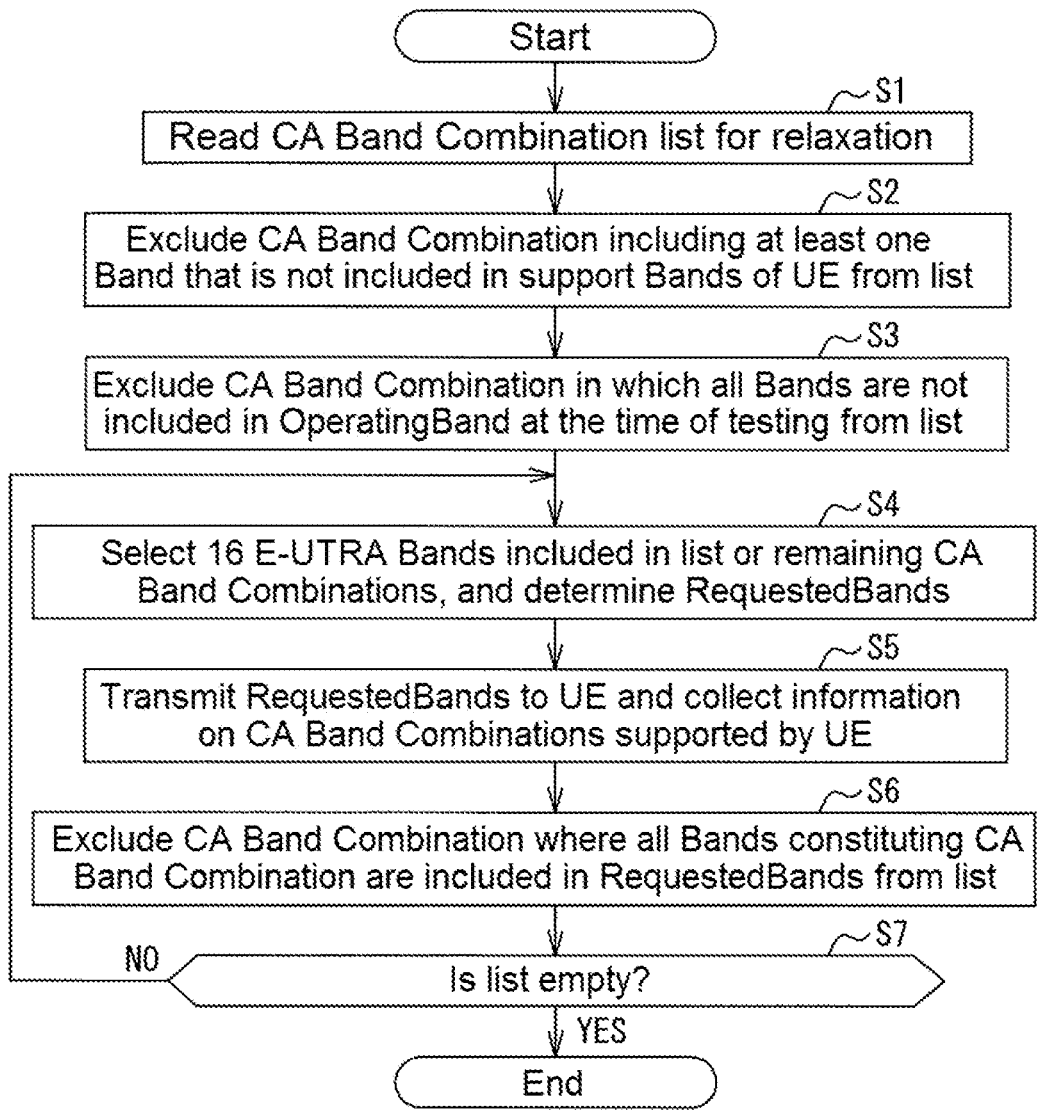
FIG. 2 is a flowchart explaining a procedure of a support combination acquisition process of the mobile terminal testing device according to the embodiment of the present invention.

The support combination acquisition extraction process performed by the mobile terminal testing device 1 according to the present embodiment configured as described above will be described with reference to FIG. 2. Note that the support combination acquisition process described below is executed when the execution of the conformance test is selected by operating the operation unit 4.

In step S1, the control unit 6 reads a CA Band Combination list in which the relaxation value is applied to the test parameter from the storage device.

In step S2, the control unit 6 excludes, from the list, a CA Band Combination that includes at least one Band that is not included in Bands (support Bands) supported by the mobile terminal 10.

In step S3, the control unit 6 further excludes, from the list, a CA Band Combination in which all Bands are not included in the OperatingBand at the time of testing.

In step S4, the control unit 6 selects 16 E-UTRA Bands included in the list of the remaining CA Band Combinations, for example, starting from the Band with the lowest Band number, and determines RequestedBands.

In step S5, the control unit 6 transmits the determined RequestedBands to the mobile terminal 10 and collects information on CA Band Combinations supported by the mobile terminal 10.

In step S6, the control unit 6 excludes, from the list, the CA Band Combination in which all Bands are included in transmitted RequestedBands.

In step S7, the control unit 6 determines whether or not the list is empty. When it is determined that the list is empty, the control unit 6 ends the process.

When it is determined that the list is not empty, the control unit 6 returns the process to step S4 and repeats the process.

Although embodiments of the present invention have been disclosed, it will be apparent to those skilled in the art that modifications may be made without departing from the scope of the invention. All such modifications and equivalents are intended to be included in the following claims.

DESCRIPTION OF REFERENCE NUMERALS AND SIGNS

1 mobile terminal testing device
2 pseudo base station unit
6 control unit

What is claimed is:

1. A mobile terminal testing device that performs a conformance test of a mobile terminal, comprising:
a control unit that excludes a carrier aggregation (CAS Band Combination including a Band that is not supported by the mobile terminal from CA Band Combinations to which a relaxation value is applied, excludes a CA Band Combination that does not include any OperatingBand to be tested, and determines a Band to be included in RequestedBands from Bands included in remaining CA Band Combinations.

2. The mobile terminal testing device according to claim 1, wherein the control unit excludes a CA Band Combination including only transmitted RequestedBands, determines a Band to be included in next RequestedBands from Bands included in remaining CA Band Combinations, and repeats transmission of the RequestedBands until there is no remaining CA Band Combination.

3. The mobile terminal testing device according to claim 1, wherein the relaxation value is a delta TIB or delta RIB.

4. A support combination acquisition method of a mobile terminal testing device that performs a conformance test of a mobile terminal, the method comprising:
a step of excluding a carrier aggregation (CAS Band Combination including a Band that is not supported by the mobile terminal from CA Band Combinations to which a relaxation value is applied;
a step of excluding a CA Band Combination that does not include any OperatingBand to be tested; and
a step of determining a Band to be included in RequestedBands from Bands included in remaining CA Band Combinations.

5. The support combination acquisition method according to claim 4, further comprising:
a step of excluding a CA Band Combination including only transmitted RequestedBands;
a step of determining a Band to be included in next RequestedBands from Bands included in remaining CA Band Combinations; and
a step of repeating transmission of the RequestedBands until there is no remaining CA Band Combination.

6. The support combination acquisition method according to claim 4, wherein the relaxation value is a delta TIB or delta RIB.

* * * * *